US008488911B2

(12) United States Patent
Kimura et al.

(10) Patent No.: US 8,488,911 B2
(45) Date of Patent: Jul. 16, 2013

(54) IMAGE PROCESSING APPARATUS FOR PROCESSING A BINARY IMAGE, IMAGE PROCESSING METHOD, AND COMPUTER READABLE MEDIUM

(75) Inventors: Shunichi Kimura, Kanagawa (JP); Ikken So, Kanagawa (JP); Yutaka Koshi, Kanagawa (JP)

(73) Assignee: Fuji Xerox Co., Ltd., Tokyo (JP)

(*) Notice: Subject to any disclaimer, the term of this patent is extended or adjusted under 35 U.S.C. 154(b) by 352 days.

(21) Appl. No.: 12/768,274

(22) Filed: Apr. 27, 2010

(65) Prior Publication Data

US 2011/0129150 A1 Jun. 2, 2011

(30) Foreign Application Priority Data

Dec. 1, 2009 (JP) ................................ 2009-273221

(51) Int. Cl.
*G06K 9/32* (2006.01)

(52) U.S. Cl.
USPC .......................................... 382/295; 382/296

(58) Field of Classification Search
None
See application file for complete search history.

(56) References Cited

U.S. PATENT DOCUMENTS 4,783,838 A * 11/1988 Matsunawa ................... 382/271
4,930,022 A * 5/1990 Kubota ......................... 358/451
5,054,099 A * 10/1991 Wakabayashi et al. ....... 382/298
5,101,443 A * 3/1992 Behrmann-Poitiers ....... 382/299
5,818,962 A * 10/1998 Mizukami ..................... 382/180
5,848,198 A * 12/1998 Penn ............................ 382/276
5,901,254 A * 5/1999 Iguchi et al. .................. 382/298
6,707,484 B1 * 3/2004 Kawasaki et al. .......... 348/14.01
6,778,703 B1 * 8/2004 Zlotnick ....................... 382/218
6,798,537 B1 * 9/2004 Lau et al. ...................... 358/1.9
7,298,896 B2 * 11/2007 Yamaguchi et al. .......... 382/172

FOREIGN PATENT DOCUMENTS

JP A-10-178544 6/1998
JP A-2001-358937 12/2001

* cited by examiner

*Primary Examiner* — Barry Drennan
*Assistant Examiner* — Feng Niu
(74) *Attorney, Agent, or Firm* — Oliff & Berridge, PLC

(57) ABSTRACT

An image processing apparatus includes a count unit, a transform unit, a first calculation unit, a second calculation unit, and a binarization unit. The count unit counts the number of pixels of an original binary image. The transform unit transforms the original binary image into a transformed image based on a given transform level. The first calculation unit calculates the number of pixels of the transformed image, based on the given transform level and the number of pixels of the original binary image. The second calculation unit calculates a threshold level based on the number of pixels for each pixel value of the transformed image and the number of pixels of the transformed image. The binarization unit binarizes the transformed image based on the threshold level.

10 Claims, 13 Drawing Sheets

2010 2020 2000

| PIXEL VALUE | CFD(※1) |
|---|---|
| 0 | |
| 1 | |
| 2 | |
| ... | ... |
| 255 | |

※1: CUMULATIVE FREQUENCY DISTRIBUTION

| | X | A |
|---|---|---|
| B | C | D |

| | X | 7/16 |
|---|---|---|
| 3/16 | 5/16 | 1/16 |

IMAGE PROCESSING APPARATUS FOR PROCESSING A BINARY IMAGE, IMAGE PROCESSING METHOD, AND COMPUTER READABLE MEDIUM

CROSS-REFERENCE TO RELATED APPLICATIONS

This application is based upon and claims priority under 35 USC 119 from Japanese Patent Application No. 2009-273221, filed Dec. 1, 2009.

BACKGROUND

1. Technical Field

The present invention relates to an image processing apparatus, an image processing method, and a computer readable medium.

2. Related Art

There is the technology of image processing directed to a binary image, for example, technology for scaling down the binary image.

SUMMARY OF THE INVENTION

According to an aspect of the invention, an image processing apparatus includes a count unit, a transform unit, a first calculation unit, a second calculation unit, and a binarization unit. The count unit counts the number of black pixels or the number of white pixels of an original binary image. The transform unit transforms the original binary image into a transformed image based on a given transform level, each pixel value of the transformed image being represented as a multiple value. The first calculation unit calculates the number of black pixels or the number of white pixels of the transformed image, based on the given transform level and the number of black pixels or the number of white pixels of the original binary image counted by the count unit. The second calculation unit calculates a threshold level based on the number of pixels for each pixel value of the transformed image and the number of black pixels or the number of white pixels of the transformed image calculated by the first calculation unit. The binarization unit binarizes the transformed image based on the threshold level.

BRIEF DESCRIPTION OF THE DRAWINGS

Exemplary embodiments of the invention will be described in detail based on the following figures, wherein.

DETAILED DESCRIPTION

First, as preparations for the description of exemplary embodiments, there will be explained an Affine transform, binarization, etc. which are image processing directed to a binary image.

<1. 1. Affine Transform>

First, coordinates (a vector) to which an Affine transform is directed are denoted by Formula (1):

[Equation 1]

$$p = \begin{pmatrix} x \\ y \end{pmatrix} \tag{1}$$

Output coordinates (a vector) are denoted by Formula (2):

[Equation 2]

$$q = \begin{pmatrix} x' \\ y' \end{pmatrix} \tag{2}$$

When the vector p is Affine-transformed to become the vector q, the vectors p and g have the relation of Formula (3):

[Equation 3]

$$q=Ap+t \tag{3}$$

where A denotes a matrix of 2×2 expressing a transformation magnitude, and t a string vector expressing a shift magnitude (refer to Formula (4)):

[Equation 4]

$$A = \begin{pmatrix} a & b \\ c & d \end{pmatrix},\ t = \begin{pmatrix} t_x \\ t_y \end{pmatrix} \tag{4}$$

By way of example, when the matrix A and the string vector t are set as indicated by Formula (5), the vector q after the transform becomes a size double that of the vector p before the transform. That is, the vector q has been scaled up double.

[Equation 5]

$$A = \begin{pmatrix} 2 & 0 \\ 0 & 2 \end{pmatrix},\ t = \begin{pmatrix} 0 \\ 0 \end{pmatrix} \tag{5}$$

Besides, by way of example, when the matrix A and the string vector t are set as indicated by Formula (6), the vector q after the transform becomes a size half that of the vector p before the transform. That is, the vector q has been scaled down to half.

[Equation 6]

$$A = \begin{pmatrix} 1/2 & 0 \\ 0 & 1/2 \end{pmatrix},\ t = \begin{pmatrix} 0 \\ 0 \end{pmatrix} \tag{6}$$

It may be generally said that the Affine transform is processing in which a parallelogram is copied into a parallelogram. Therefore, a pixel having originally been a square is transformed into the shape of the parallelogram. However, the matrix A needs to be regular (a determinant is not zero, or it has an inverse matrix) in order that a copy goal may be the parallelogram. In exemplary embodiments to be stated later, there shall be executed processing limited to a case where the matrix A is regular.

<1. 2. Definition of Pixel Coordinates>

Figure 1:
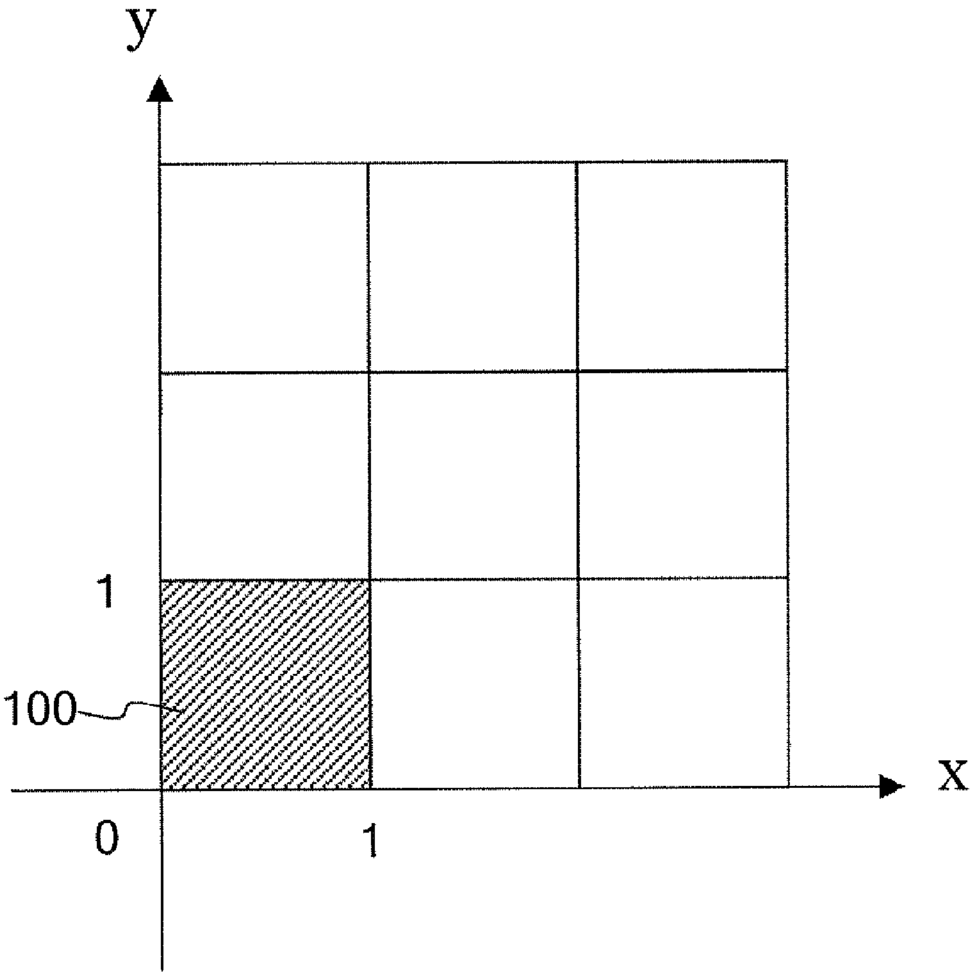
FIG. 1 is an explanatory diagram showing an example of one pixel within an image.

Hereinbelow, one pixel of an image shall be represented by a square whose vertical length is "1" and whose horizontal length is "1". Besides, it is assumed that the coordinate values of segments surrounding each pixel of the image are arrayed so as to become integers on an (x, y) coordinate system. By way of example, as shown in FIG. 1, in a coordinate system whose origin (0, 0) lies at a left lower end, the coordinates of the vertices of one pixel 100 within an image to-be-processed become (0, 0), (1, 0), (0, 1) and (1, 1), and the coordinates of the vertices of the other pixels are also arrayed so as to become integers on the (x, y) coordinate system.

Each pixel of the image to-be-processed (hereinbelow, sometimes termed the "pertinent image"), or each pixel of an output image subjected to Affine transform processing (hereinbelow, in a case where an image is merely termed the "output image", it shall indicate the pertinent image which has been subjected to the Affine transform, but which is before binarization) is arranged on the grid having the vertical and horizontal lengths of "1" as exemplified in FIG. 1.

<1. 3. Affine Transform Employing Projection Method>

Next, there will be explained a method in which the Affine transform of the binary image to-be-processed is executed using the above definition.

Figure 2:
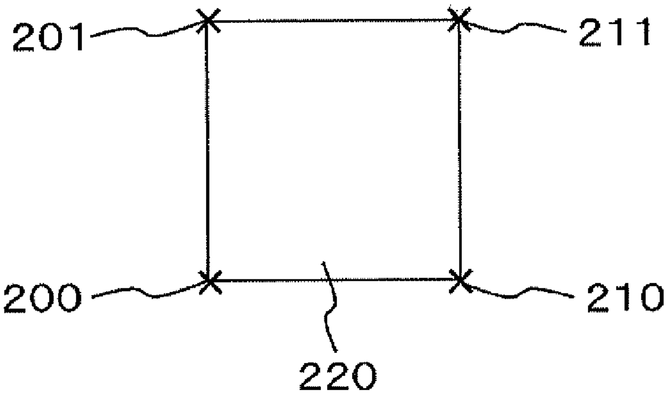
FIG. 2 is an explanatory diagram showing an example of the vector representation of a pixel.

First, it is assumed that N pixels are contained in the binary image to-be-processed. The ith pixel is denoted by "Pi". Besides, the coordinates of the four vertices of the pixel Pi are denoted by (pi00, pi10, pi01, pi11) as a vector representation. More specifically, as exemplified in FIG. 2, the left lower vertex of an image 220 becomes a position vector 200 (pi00), the left upper vertex a position vector 201 (pi01), the right lower vertex a position vector 210 (pi10), and the right upper vertex a position vector 211 (pill).

Here, it is assumed that the pixel Pi is subjected to the Affine transform. A pixel after the Affine transform is denoted by Qi. When the position vectors of the four vertices of the pixel Qi are denoted by (qi00, qi10, qi01, qi11), they become as indicated by Formula (7):

[Equation 7]

$$qi_{uv}=Api_{uv}+t \tag{7}$$

where u∈{0, 1} and v∈{0, 1} hold.

Figure 3:
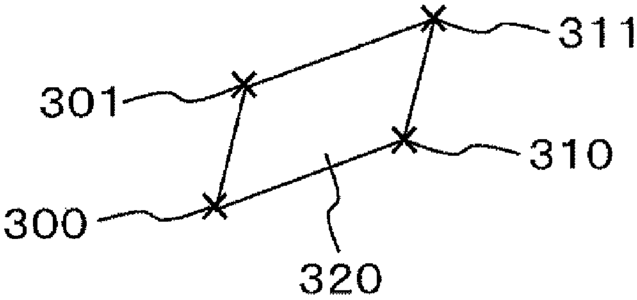
FIG. 3 is an explanatory diagram showing an example of a pixel subjected to an Affine transform.

Accordingly, the transform becomes as exemplified in FIG. 3, and the shape of the pixel Qi (image 320) after the Affine transform becomes a parallelogram whose vertices are a position vector 300 (qi00), a position vector 301 (qi01), a position vector 310 (qi10) and a position vector 311 (qi11).

Figure 4:
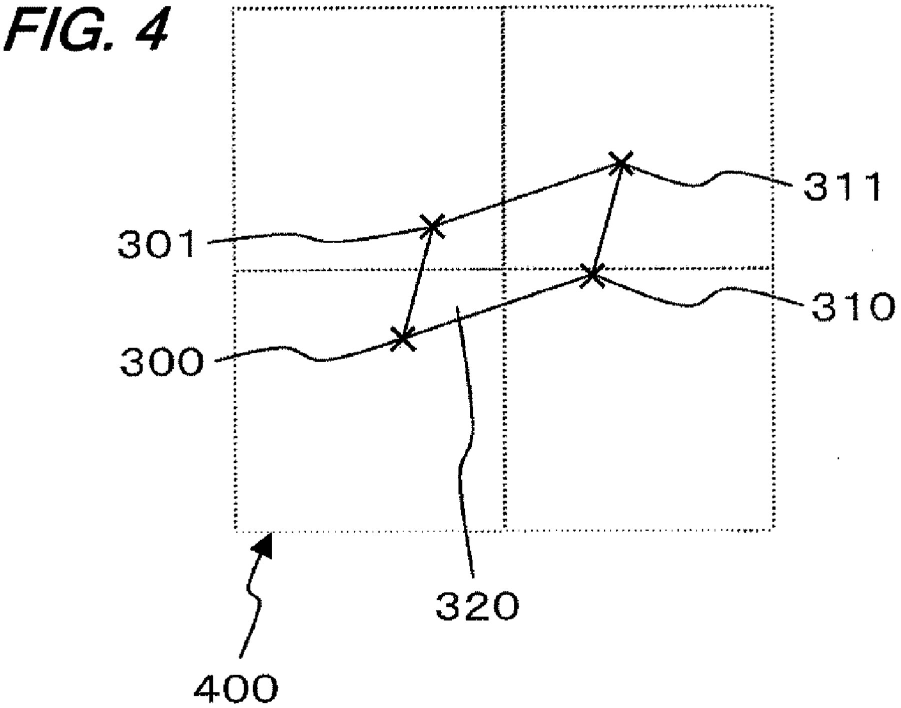
FIG. 4 is an explanatory diagram showing an example of the relation between the pixel subjected to the Affine transform and the pixel of an output image.

The pixel values of an output image will be obtained in this state. One pixel of the output image is a grid (the example of FIG. 1) whose vertical and horizontal lengths are "1". Therefore, an example in which the parallelogram shown in the example of FIG. 3 is displayed in superposition on the grid of the output image (each grid represents a pixel) is shown in FIG. 4. In FIG. 4, squares surrounded with dotted lines (four squares constituting an output image 400) correspond to one pixel of the output image.

Figure 5:
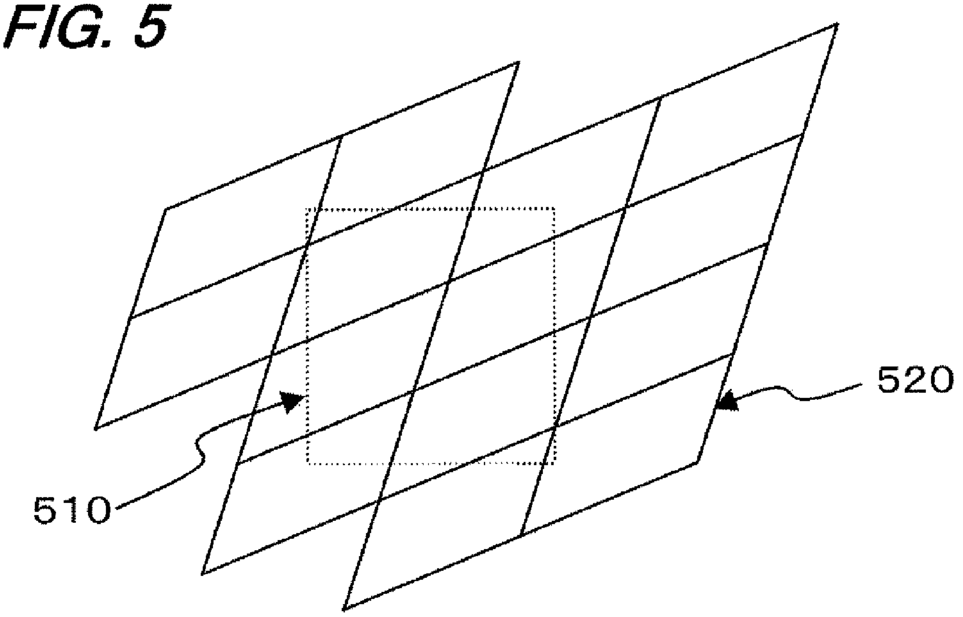
FIG. 5 is an explanatory diagram showing an example of the relation between the pixel subjected to the Affine transform and the pixel of an output image.

Therefore, note is taken of one pixel Rj of the output image. Assuming that the number of pixels contained in the output image is "M", "j" denotes an index indicating the pixel of the output image. Now, one or more pixels Q after the Affine transform are contained within the pixel Rj. As exemplified in FIG. 5, one or more pixels Q within a pixel 520 after the Affine transform is/are contained within the pixel 510 (Rj) of the output image.

On this occasion, a value obtained in such a way that the area of the pixel Qi of the pertinent image existing inside the pixel Rj of the out put image divided by the area of the pixel Rj of the output image (the area proportion of the pixel Qi existing inside the pixel Rj of the output image) is defined as indicated in Formula (8):

[Equation 8]

$$w_{QiRj} \tag{8}$$

Since the area of the pixel Rj is "1", it may well be said that Formula (8) indicates the area proportion of the pixel Qi existing inside the pixel Rj. Incidentally, the pixel Qi as to which Formula (8) is "0" exists outside the pixel Rj.

Here, the pixel value of the ith pixel Pi within the image to-be-processed will be denoted by Xi. Likewise, the pixel value of the pixel Rj of the jth output image will be denoted by Yj. The pixel value Yj may be calculated as indicated by Formula (9):

[Equation 9]

$$Y_j = \sum_i w_{QiRj} X i \tag{9}$$

Alternatively, the pixel value Yj may be calculated by subjecting the pixel grid of the output image to an inverse transform.

When the position vectors of the four vertices of the pixel Rj of the output image are denoted by (rj00, rj10, rj01, rj11), and when these vectors are inverse-transformed by Formula (10), the pixel of the output image may be mapped on the pixel of the pertinent image:

[Equation 10]

$$sj_{uv}=A^{-1}(rj_{uv}-t) \tag{10}$$

where u∈{0, 1} and v∈{0, 1} hold.

Figure 6:
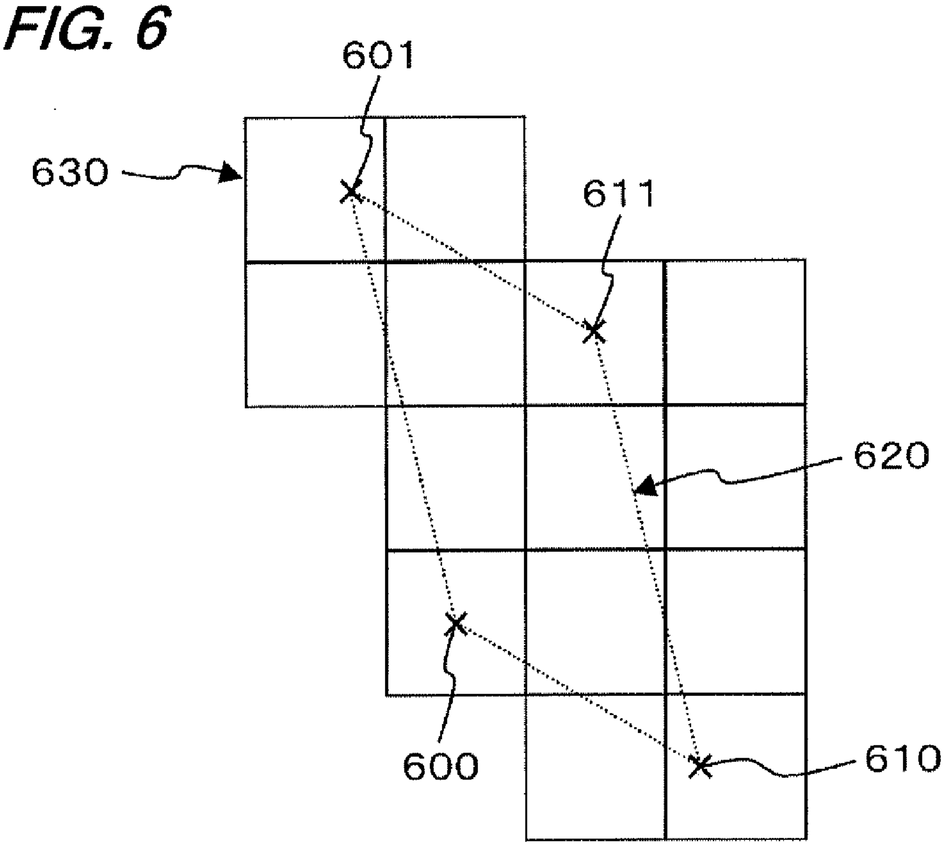
FIG. 6 is an explanatory diagram showing an example of the relation between a pixel subjected to an inverse Affine transform and the pixel of an image to-be-processed.

(sj00, sj10, sj01, sj11) denote position vectors at the time when the vertex positions of the pixel of the output image have been mapped in the pertinent image. The pixel of a parallelogram whose four vertices are (sj00, sj10, sj01, sj11) is denoted by "Sj". As exemplified in FIG. 6, in contrast to the pixel 630 of the pertinent image, the pixel 620 after the inverse Affine transform is a pixel surrounded with a parallelogram which keeps the vertices of the position vector 600 (sj00), the position vector 601 (sj01), the position vector 610 (sj10) and the position vector 611 (sj11).

On this occasion, a value obtained in such a way that the area of the pixel Pi of the pertinent image existing inside the pixel Sj of the output image is divided by the area of the pixel Sj of the output image (the area proportion of the pixel Pi existing inside the pixel Sj) is defined as indicated by Formula (11):

[Equation 11]

$$w_{PiSj} \tag{11}$$

Here, Formula (12) holds, and hence, the pixel value Yj of the output image may be calculated by Formula (13):

[Equation 12]

$$w_{PiSj} = w_{QiRj} \tag{12}$$

[Equation 13]

$$Yj = \sum_i w_{piSj} Xi \tag{13}$$

In actuality, either of Formulas (8) and (11) as gives an easier calculation may be adopted. Hereinbelow, Formula (14) will be set because Formulas (8) and (11) need not be distinguished:

[Equation 14]

$$w_{ij}=w_{PiSj}=w_{QiRj} \tag{14}$$

As the conclusion of this section, the pixel value after the Affine transform based on the projection method becomes as indicated by Formula (15):

[Equation 15]

$$Yj = \sum_i w_{ij} Xi \tag{15}$$

where it needs to be noted that the pixel value Yj calculated here is a multiple value (gray value), and that it is not binary.

<1. 4. Affine Transform Employing Interpolation Method>

For the calculation of a pixel value after an Affine transform, there is a technique wherein the value between pixels is found by interpolation with surrounding pixel values as in a linear interpolation method (bilinear method), a cubic convolution method (bicubic method) or the like.

With, for example, the linear interpolation method, processing becomes as stated below.

Figure 7:
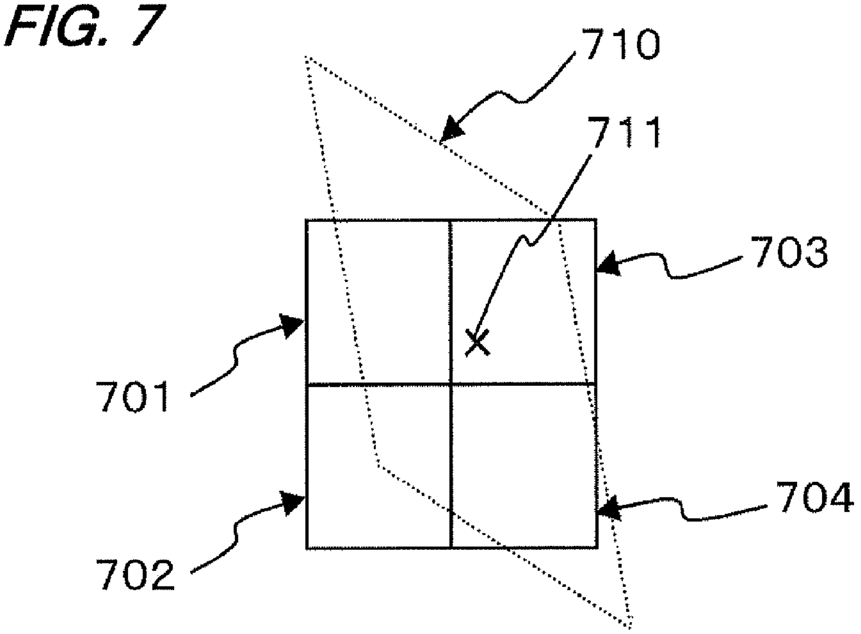
FIG. 7 is an explanatory diagram showing an example of the relation between the pixel subjected to the inverse Affine transform and pixel of the image to-be-processed.

As exemplified in FIG. 7, the coordinates of the central point 711 (intersection point of two diagonal lines) of a pixel 710 (Sj) after the inverse Affine transform are let be (sjx, sjy). Likewise, the coordinates of the central point of the pixel Pi of the pertinent image are let be (pix, piy).

Here, the four pixels of the pertinent image near the central point of the image Sj are denoted by P1 (pixel 701), P2 (pixel 702), P3 (pixel 703) and P4 (pixel 704). The pixel values of the four pixels P1, P2, P3 and P4 are let be X1, X2, X3 and X4. On this occasion, when the pixel value Yj of the pixel Sj of the output image is denoted by Formula (16), it may be represented by a form as indicated by Formula (17):

[Equation 16]

$$\alpha=sjx-plx$$

$$\beta=ply-sjy \tag{16}$$

[Equation 17]

$$Yj=\alpha\beta X1+\alpha(1-\beta)X2+(1-\alpha)\beta X3+(1-\alpha)(1-\beta)X4 \tag{17}$$

The form of Formula (17) is the same as that of Formula (15). A weight wij for any pixel other than the four surrounding pixels may be considered as "0". In the above explanation, the linear interpolation method has been employed, so that the values of the four surrounding pixels near the central point of the pixel Sj of the output image have been used. However, with the other interpolation scheme, for example, the cubic convolution, the values of sixteen surrounding pixels are used. Also in that case, a calculation formula having the same form as that of Formula (15) is obtained.

After all, the weight wij is appropriately calculated, whereby the pixel value of the pixel Sj of the output image is found in the form of Formula (15) with either the projection method or the interpolation method.

<1. 5. Binarization>

In general, the output of Formula (15) becomes a multiple value, for example gray value. For obtaining a binary image output, the multiple value (for example gray value) needs to be binarized. Hereinbelow, a result obtained by binarizing the multiple-value data Yj will be denoted by "Zj".

By way of example, the pixel values of the target image are assumed here to be the two values of "0" and "1". On this occasion, the output Yj of Formula (15) becomes the real-number value of:

$$0 \leqq Yj \leqq 1$$

In order to turn the real-number value into the binary value of "0" or "1", threshold value processing is generally executed. More specifically, Formula (18) is applied by the use of a predetermined threshold value TH:

[Equation 18]

$$Zj=0 \text{ for } Yj<TH$$

$$Zj=1 \text{ for } Yj\geqq TH \quad (18)$$

In the comparison of the pixel value Yj and the threshold value TH in Formula (18), Zj=0 may be set or Zj=1 may well be set, in case of an equality. Either will do.

In this manner, when the binarization is executed with the single threshold value, the smoothness of the straight line or curve of the target image fails to be saved in some cases. Such an inconvenient example will be stated below. Here, an example in which a shift is executed (Formula 19) will be indicated as a simple Affine transform:

[Equation 19]

$$A=\begin{pmatrix}1 & 0\\ 0 & 1\end{pmatrix} \text{ and } t=\begin{pmatrix}1/3\\ 1/3\end{pmatrix} \quad (19)$$

Figure 8:
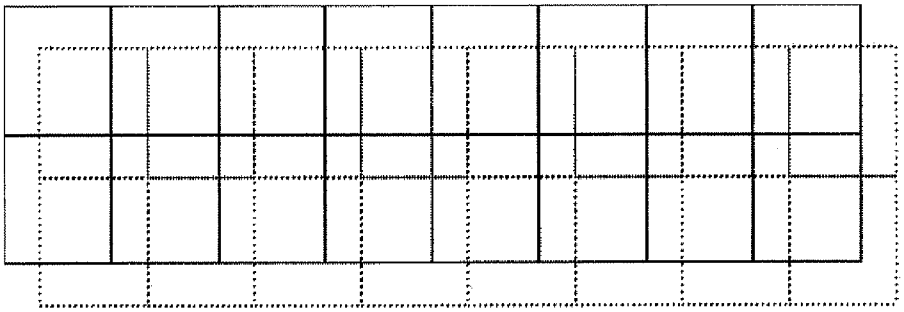
FIG. 8 is an explanatory diagram showing an example of a shift transform.

In this transform, the pixel is shifted ⅓ pixel in an x-direction and a y-direction, respectively. As to an example of FIG. 8, a tetragon surrounded with solid lines is a pixel before the transform, and a tetragon surrounded with dotted lines is a pixel after the transform.

Figure 9:
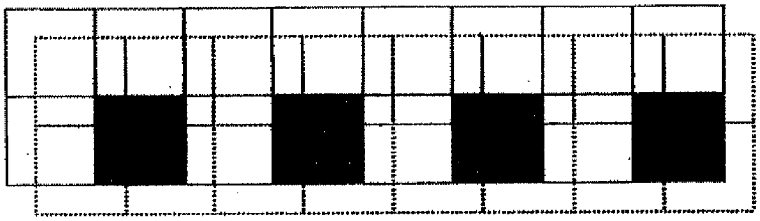
FIG. 9 is an explanatory diagram showing an example of a shift transform.

Here, an image before the transform is assumed as exemplified in FIG. 9. That is, the image is such that a black pixel is arrayed every second column in the row of a lower stage.

Here, a pixel value after the transform is calculated by employing the projection method.

Figure 10:
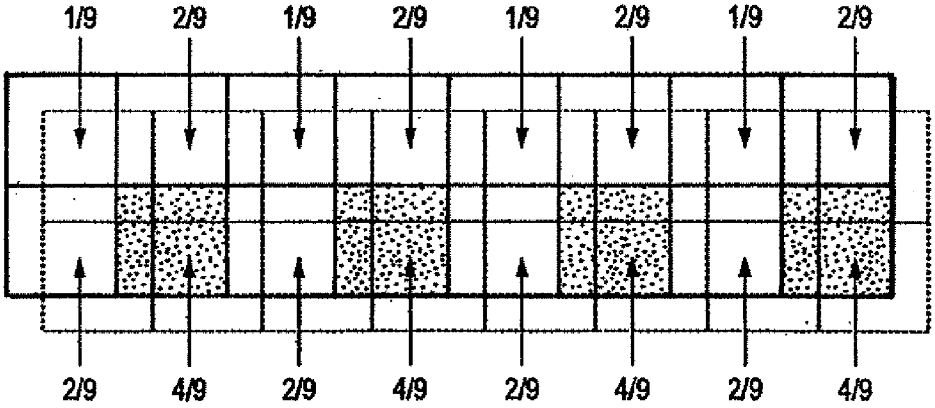
FIG. 10 is an explanatory diagram showing an example of the density values of individual pixels subjected to the shift transform.

With the projection method, a density value is calculated using an area ratio, and hence, the pixel value (gray value) of each pixel before the binarization becomes as exemplified in FIG. 10. More specifically, the pixel value of the pixel at the left corner of the upper stage of the output image is 1/9, the pixel value of the right adjacent pixel thereof is 2/9, the pixel value of the pixel at the left corner of the lower stage is 2/9, and the pixel value of the right adjacent pixel thereof is 4/9.

Figure 11:
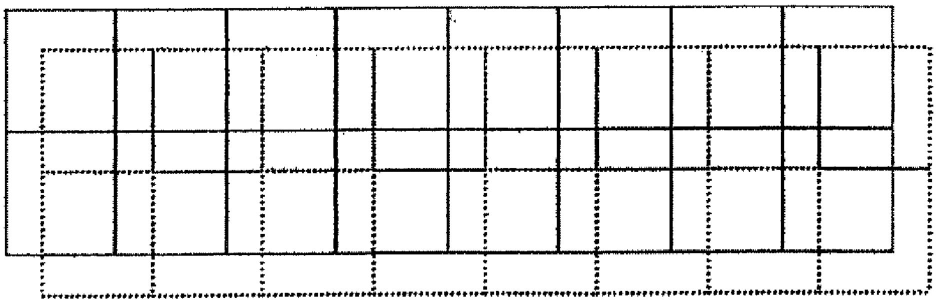
FIG. 11 is an explanatory diagram showing an example in which binarization has been executed after the shift transform.

Usually, "0.5" is often used as the threshold value TH of Formula (18). In case of the example of FIG. 10, all the pixel values after the transform are less than the threshold value TH (0.5), so that the binary image of an output becomes an image which is entirely white as exemplified in FIG. 11.

Since the inconvenience (variance of the density) as stated before might occur, processing in which the density of a pertinent image is saved is executed by performing error diffusion in the prior-art example of JP-A-10-178544, JP-A-2001-358937 or the like. Since the density is saved in the error diffusion, there is not the case that the dotted lines disappear. However, in the case where the error diffusion has been performed, there is the case that shaking arises in the straight line or the like. A case example of the error diffusion will be indicated below.

The Affine transform is assumed as indicated by Formula (20):

[Equation 20]

$$A=\begin{pmatrix}1 & 0\\ 0 & 1\end{pmatrix} \text{ and } t=\begin{pmatrix}0\\ 1/3\end{pmatrix} \quad (20)$$

In this Affine transform, each pixel is shifted ⅓ pixel in the y-direction.

Figure 12:
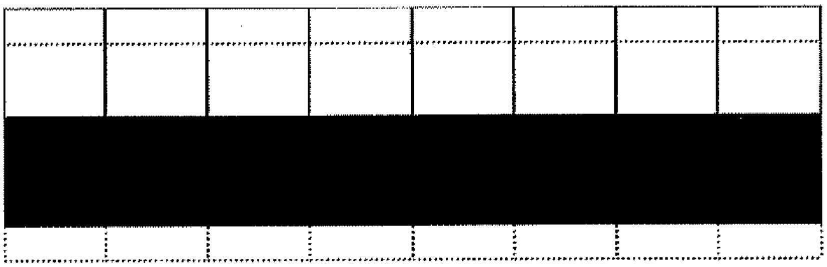
FIG. 12 is an explanatory diagram showing an example of the shift transform.
Figure 13:
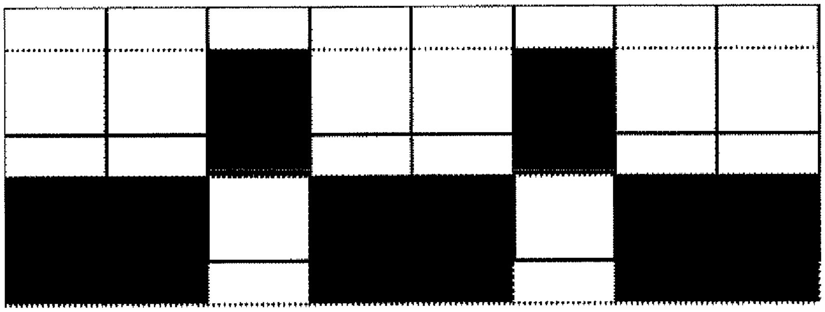
FIG. 13 is an explanatory diagram showing an example in which binarization based on error diffusion has been executed after the shift transform.

An image before the transform is exemplified in FIG. 12. The image before the transform is a horizontal line having one vertical pixel width. When this image (straight line image) is transformed to pixel positions of dotted lines and is further binarized by the error diffusion, an example of FIG. 13 is obtained.

In the error diffusion scheme, the errors are diffused so as to save the density to the utmost. Therefore, even a place whose original density is low is binarized as a black pixel when the diffused errors happen to be accumulated. Further, when the pixel of low density has become the black pixel, the errors are diffused into the adjoining pixels in the direction of lowering the density, and hence, the pixel which is originally high in density may become a white pixel.

As stated before, when the error diffusion is performed, the shaking appears in the dead straight line. Such a case occurs even in an image other than the straight line, and the shaking having appeared is sensed. Alternatively, the shaking is sometimes sensed as a blur. More specifically, when the image is seen from a near place (or the image is of low resolution), the shaking is observed, but when the image is seen from a far place (or the image is of high resolution), the shaking is sometimes felt as the blur on account of a human visual frequency.

Especially, in data such as a straight line, a pattern or a character created by CG (Computer Graphics), a rectilinearity is high, or a curve is smooth. Therefore, in a case where the data has been scaled-up, scaled-down or Affine-transformed, the shaking or blur thereof is particularly felt uneasy in some cases.

<2. Summary of Exemplary Embodiments>

First, in each exemplary embodiment to be described below, the number of black pixels of a binary image which is a subject to-be-processed will be measured. "K" is let denote the number of black pixels of the binary image to-be-processed.

In the Affine transform which uses a matrix A, the area of a tetragon after the transform becomes det(A) times the area of the tetragon before the transform. Here, the "det(A)" denotes the determinant of the matrix A. Therefore, the number L of black pixels (target number of black pixels) of the binary image after the transform is obtained in conformity with Formula (21):

[Equation 21]

$$L=det(A)K \quad (21)$$

In case of simple scaling-up or scaling-down, the determinant det(A) may be computed as the square of a scaling-up rate (or scaling-down rate). Here, the "scaling-up rate" indicates (the vertical or horizontal image size or number of pixels of an output image)/(the vertical or horizontal image size or number of pixels of the image to-be-processed). Also, the definition of the "scaling-down rate" is the same as that of the scaling-up rate.

In each exemplary embodiment to be described below, the threshold value TH which satisfies the number L will be calculated every image.

For this purpose, the frequency distribution of the image (gray value) after the transform (and before the binarization) will be calculated.

By way of example, the gray value G shall be represented by an 8-bit integer F here.

The gray value G assumes a value from "0" to "1.0". The interval [0, 1] may be divided by "256", and may be mapped into values (F) from "0" to "255". Here, however, black is set at the value of "0", and white at the value of "255". That is, the gray value G=0 is mapped at F=255, and the gray value G=1 at F=0. Intervening values are linearly mapped.

Figure 14:
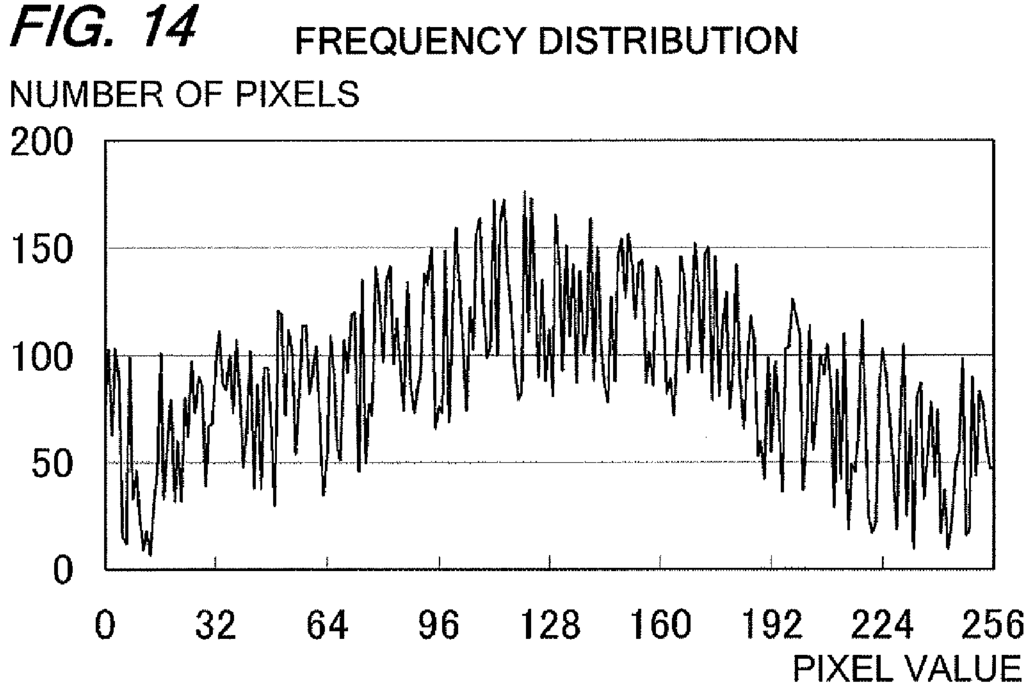
FIG. 14 is a graph of a frequency distribution showing a relational example of pixel values and the numbers of pixels.

In this way, data (the frequency distribution of F) indicating how many pixels exist every value of F may be acquired (refer to FIG. 14).

Figure 15:
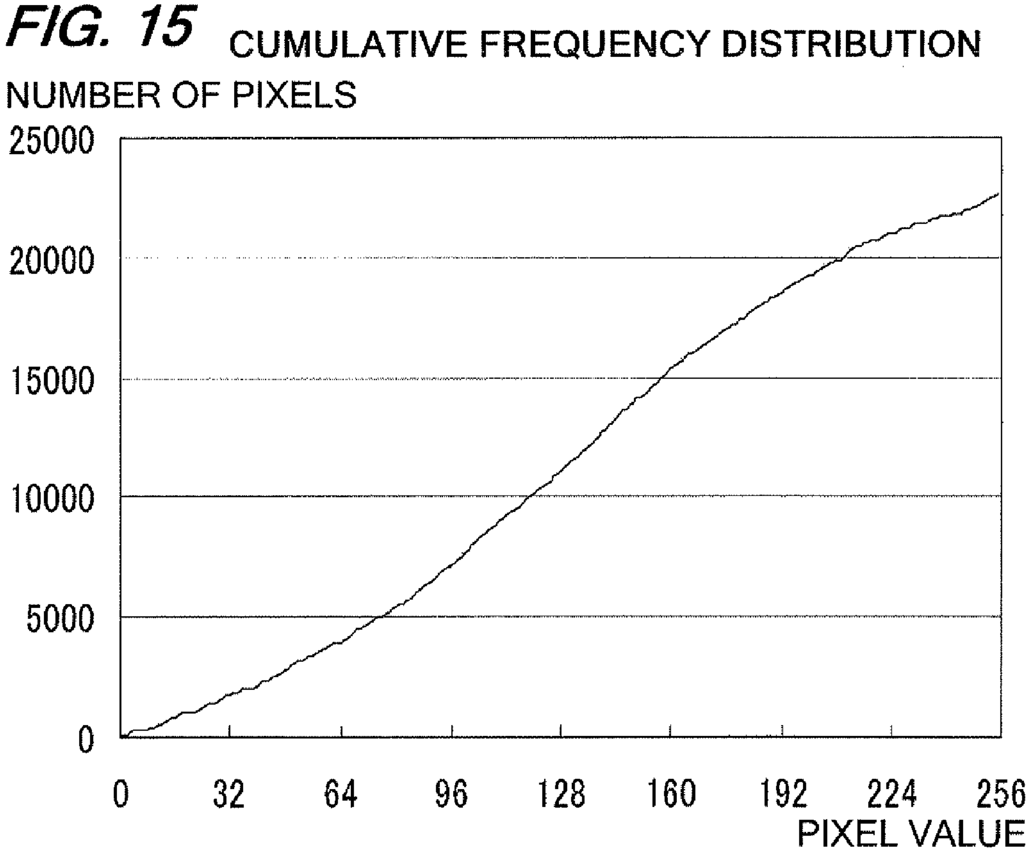
FIG. 15 is a graph of a cumulative frequency distribution showing a relational example of pixel values and the numbers of pixels.

Subsequently, a cumulative frequency distribution is acquired from the distribution. This cumulative frequency distribution is obtained by plotting the numbers of pixels below the pixel value F (refer to FIG. 15). The number of all the pixels of the output image is reached at the pixel value F=255.

Figure 16:
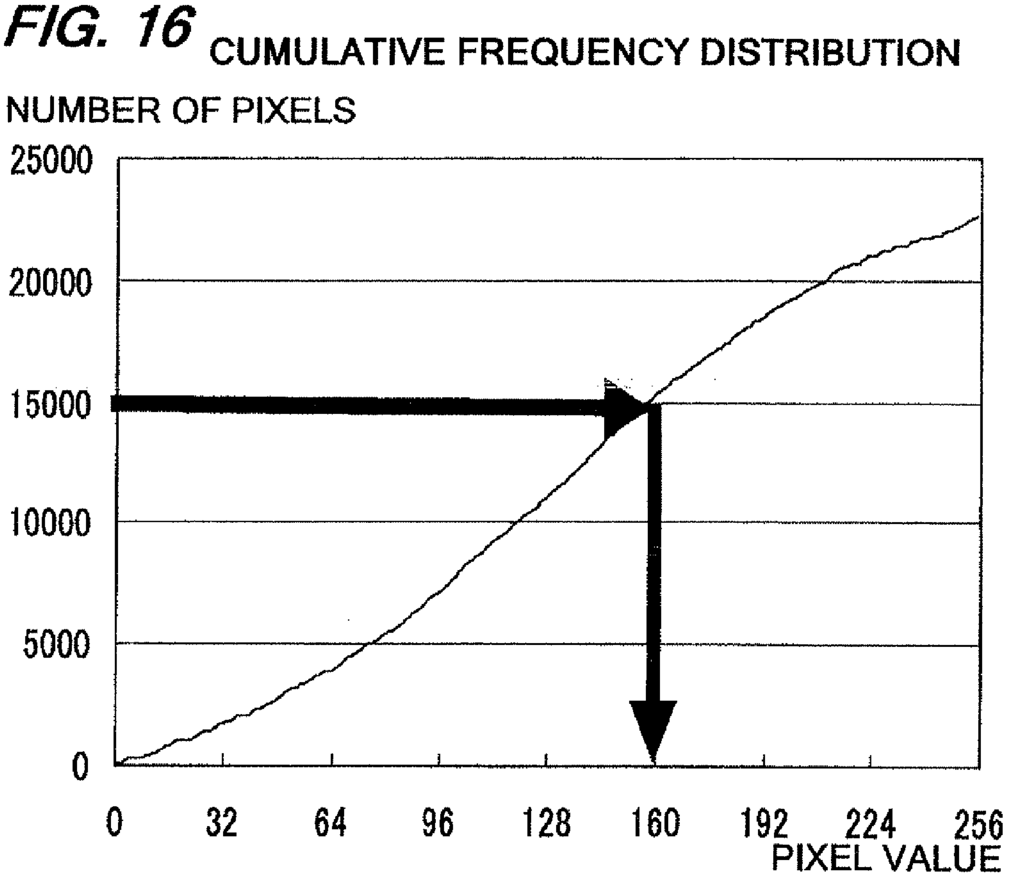
FIG. 16 is an explanatory diagram showing an example in which the threshold value of binarization is determined from the graph of the cumulative frequency distribution.

Here, by way of example, the number L of the black pixels of the binary image after the transform is assumed to be 15000. The threshold value realizing the number L may be found as exemplified in FIG. 16, by using the cumulative frequency distribution exemplified in FIG. 15. That is, the pixel value F which has a cumulative frequency nearest to the value of the number L is set as the threshold value.

Since the threshold value TH must be finally be a value comparable with the pixel value G, the threshold value calculated at 160 in terms of the pixel value F may be mapped to a value within [0, 1.0].

(Alternatively, in actuality, the gray pixel value G itself is not computed as a real number value within [0, 1.0], but the pixel value is often computed as an integer value of from "0" to "255". In this case, the pixel value G and the pixel value F become quite the same, and hence, any transform is not needed.)

Although the 8-bit integer has been used as the pixel value F in the above, this pixel value may consist of any bits. It may well be considered as a fixed decimal point, not the integer.

Although the actual number of pixels has been used as the number K of pixels or the target number L of pixels, it may well be replaced with the value of a ratio obtained by dividing it by the whole number of pixels. Further, any other value may be used as long as the ratio between the number K of pixels and the target number L of pixels does not change. In this regard, the cumulative frequency distribution may merely be taken using the value.

The threshold value TH is determined as stated above, and the binarization is executed by employing Formula (18).

Figure 17:
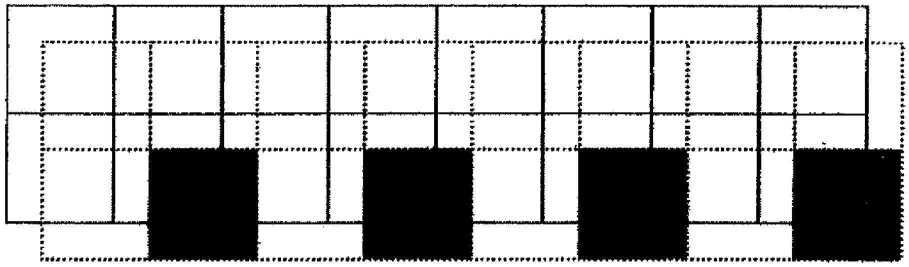
FIG. 17 is an explanatory diagram showing an example of a shift transform.
Figure 18:
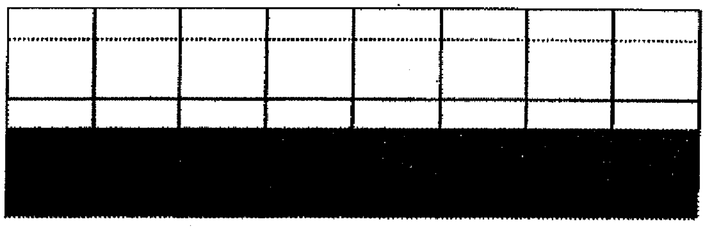
FIG. 18 is an explanatory diagram showing an example in which binarization according to an exemplary embodiment has been executed after the shift transform, and the diagram of FIG. 18 is a transformed image of FIG. 12.

In this way, in the case of the example of FIG. 9, the dotted lines may be held as exemplified in FIG. 17.

Besides, in the case exemplified in FIG. 12, a linearity may be held.

<3. 1. First Exemplary Embodiment>

Hereinbelow, examples of various preferred embodiments for incarnating the present invention will be described in conjunction with the drawings.

Figure 19:
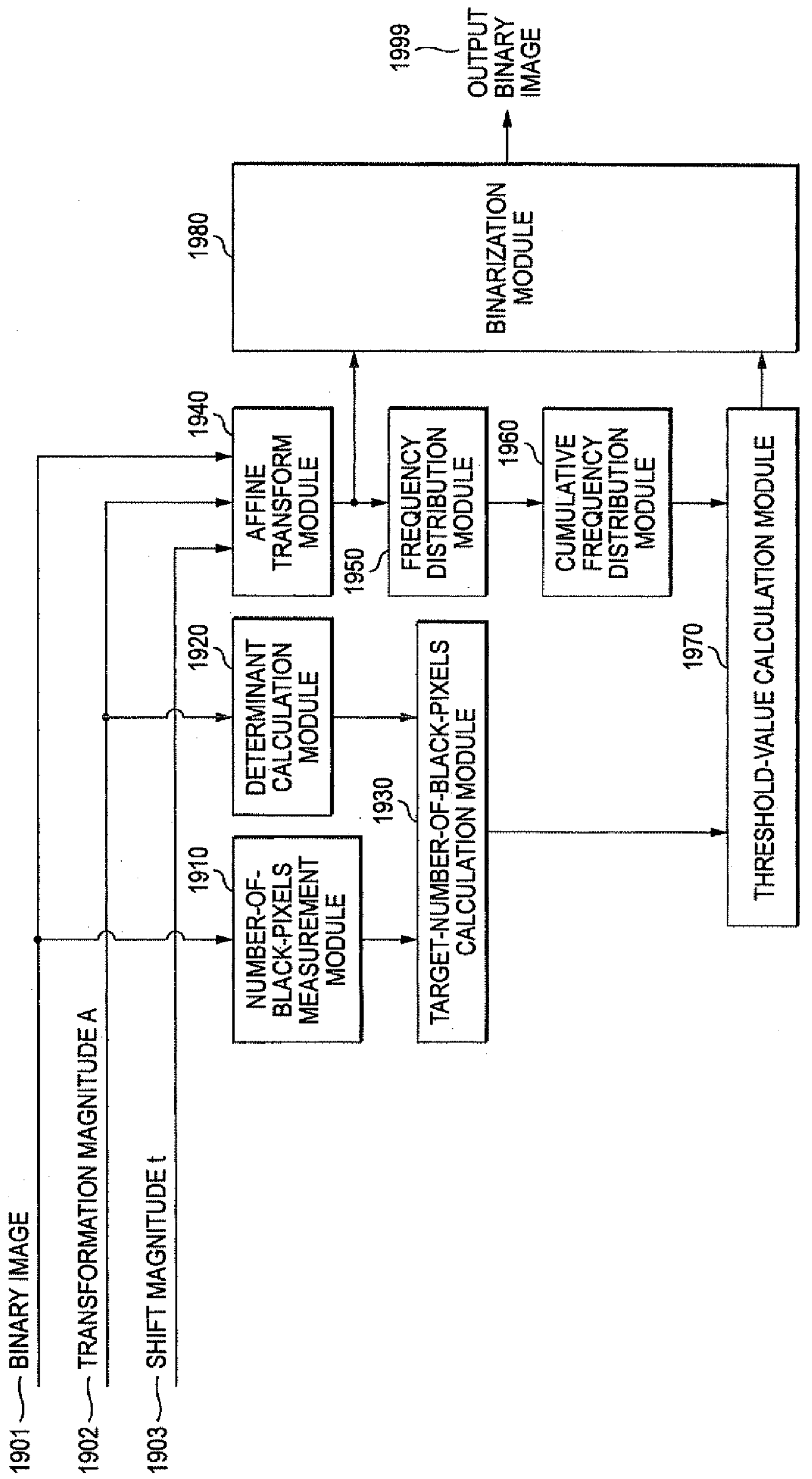
FIG. 19 is a conceptual module configuration diagram concerning a configurational example of the exemplary embodiment.

FIG. 19 shows a conceptual module configuration diagram concerning a configurational example of the first exemplary embodiment.

Incidentally, a "module" generally signifies the component of software (a computer program), hardware or the like as is logically separable. Accordingly, the module in this exemplary embodiment signifies, not only the module in the computer program, but also the module in the hardware configuration. Therefore, this exemplary embodiment serves also for describing the computer program, a system and a method. However, "stored", "caused to store", or wording equivalent thereto will be used for the sake of convenience, and the wording will signify "stored in a storage device" or "controlled so as to store data in a storage device", in the case where the exemplary embodiment is the computer program. Besides, the module may be in one-to-one correspondence with a function, but in installation, one module may well be configured of one program, or a plurality of modules may well constitute one program, or conversely, one module may well be constituted by a plurality of programs. Besides, a plurality of modules may be executed by one computer, or one module may well be executed by a plurality of computers with the computers in a decentralized or parallel environment. Incidentally, one module may well include another module. Besides, hereinbelow, the expression "connection" will be used, not only in case of a physical connection, but also in case of a logical connection (the exchange of data, a command, the reference relation between data, or the like).

In addition, a "system" or "apparatus" is configured in such a manner that a plurality of computers, hardware elements, devices or the likes are connected by a network (including a communication connection of one-to-one correspondence) or the like communication means, and it also includes a case where it is incarnated by one computer, hardware element, device or the like. The expressions "apparatus" and "system" will be used as terms having the same significances each other. As a matter of course, the expression "system" does not include a mere social "setup" (social system) which is an artificial agreement.

As shown in FIG. 19, an image processing apparatus which is this exemplary embodiment has a number-of-black-pixels measurement module 1910, a determinant calculation module 1920, a target-number-of-black-pixels calculation module 1930, an Affine transform module 1940, a frequency distribution module 1950, a cumulative frequency distribution module 1960, a threshold-value calculation module 1970, and a binarization module 1980.

The image processing apparatus accepts the following three:

(1) Binary image 1901 which is a subject to-be-processed (2) Transformation magnitude A 1902

(3) Shift magnitude t 1903

The acceptance of the binary image 1901 includes, for example, loading an image with a scanner, a camera or the like, receiving an image from an external equipment through a communication line with a facsimile or the like, and reading out an image which is stored in a hard disk (including, not only one built in a computer, but also one connected through a network, and the like).

The transformation magnitude A 1902 is the matrix of 2×2 within Formula (4) indicating the Affine transform. In case of simple scaling-up or scaling-down, the transformation magnitude A 1902 may well be a scaling-up rate or scaling-down rate of scalar value, unlike the matrix.

The shift magnitude t 1903 is the two-dimensional vector within Formula (4) indicating the Affine transform. In a case where a shift is not performed, the shift magnitude t 1903 need not exist.

The acceptance of the transformation magnitude A 1902 or the shift magnitude t 1903 includes, for example, a manipulation by a user, receiving a value from an external equipment through a communication line, and reading out a value stored in a hard disk or the like.

The number-of-black-pixels measurement module 1910 receives the binary image 1901 and is connected with the target-number-of-black-pixels calculation module 1930, whereby the number of black pixels of the binary image 1901 is counted by the number-of-black-pixels measurement module 1910, and the number of black pixels being the count result is delivered to the target-number-of-black-pixels calculation module 1930.

The determinant calculation module 1920 receives the transformation magnitude A 1902 and is connected with the target-number-of-black-pixels calculation module 1930, whereby the determinant of the transformation magnitude A 1902 is computed, and the computed determinant is delivered to the target-number-of-black-pixels calculation module 1930. In the case of the simple scaling-up or scaling-down, a calculation such as the square of the scaling-up rate may be used. In a case where vertical and horizontal scaling-up rates are different, it is also allowed to use (the vertical scaling-up rate)×(the horizontal scaling-up rate). Anyway, these calculations are comprehended in the calculation of the determinant.

The target-number-of-black-pixels calculation module 1930 is connected with the number-of-black-pixels measurement module 1910, the determinant calculation module 1920 and the threshold-value calculation module 1970, thereby to multiply the number of black pixels counted by the number-of-black-pixels measurement module 1910 and the determinant calculation result based on the determinant calculation module 1920, to calculate the target number of black pixels as is the number of black pixels in the case where the binary image 1901 has been transformed on the basis of the transformation A 1902 or the shift magnitude t 1903 (including the case of only the transformation magnitude A 1902 and the case of both the transformation magnitude A 1902 and the shift magnitude t 1903), and to deliver the target number of black pixels being the calculated result, to the threshold-value calculation module 1970.

The Affine transform module 1940 receives the binary image 1901, the transformation magnitude A 1902 and the shift magnitude t 1903, and it is connected with the frequency distribution module 1950 and the binarization module 1980. It Affine-transforms the binary image 1901 on the basis of the transformation magnitude A 1902 or the shift magnitude t 1903 (including the case of only the transformation magnitude A 1902 and the case of both the transformation magnitude A 1902 and the shift magnitude t 1903). The method stated before is employed for the Affine transform. The image (gray values) after the Affine transform is delivered to the frequency distribution module 1950 and the binarization module 1980.

Here, the pixel values after the Affine transform shall be represented by the gray values of 256 values of from "0" to "255". This may well be calculated in such a way that white in the binary image 1901 is set at "255", while black is set at "0", that the Affine transform is executed by a floating decimal point calculation (or a fixed decimal point calculation), and that transform results are rounded into integers. Of course, it is also allowed to execute the Affine transform by setting black at "1" and white at "0", and to map the values of "0"-"1" of transform results linearly to the values of "255"-"0".

The frequency distribution module 1950 is connected with the Affine transform module 1940 and the cumulative frequency distribution module 1960, and it measures the numbers of pixels for the respective pixel values of from "0" to "255" within the image Affine-transformed by the Affine transform module 1940. Further, it delivers measured results to the cumulative frequency distribution module 1960.

The cumulative frequency distribution module 1960 is connected with the frequency distribution module 1950 and the threshold-value calculation module 1970, and it calculates the numbers of pixels of and below a pixel value F. Incidentally, the pixel value F is a value of from "0" to "255".

Figures 20, 21:
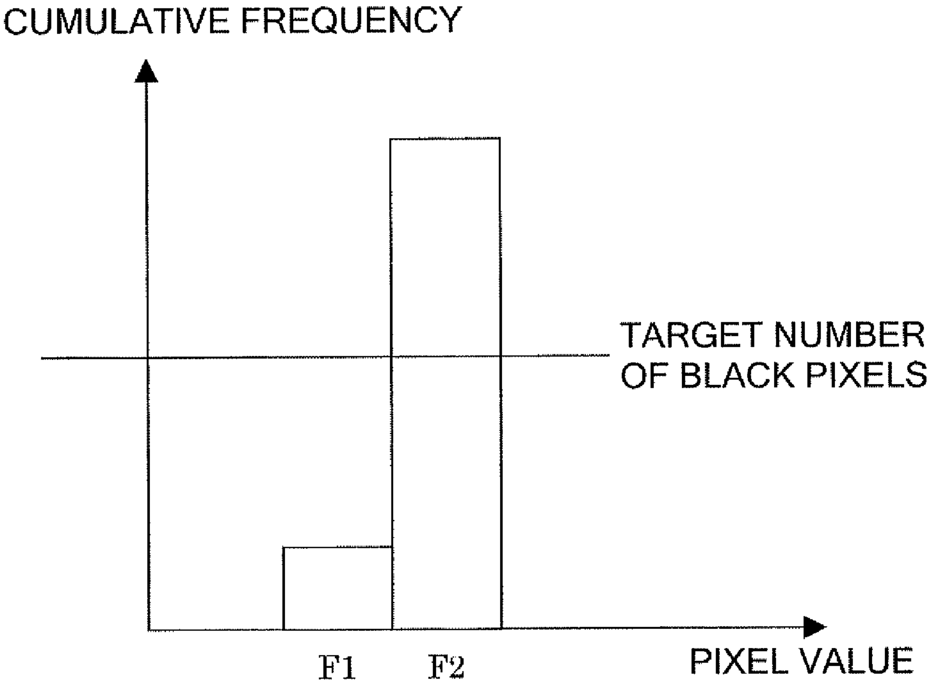
FIG. 20 is an explanatory diagram showing a data structure example of a cumulative frequency distribution table.
FIG. 21 is a graph representing a relational example of pixel values and cumulative frequencies.

The output of the cumulative frequency distribution module 1960 becomes a cumulative frequency distribution table 2000 as exemplified in FIG. 20. FIG. 20 is an explanatory diagram showing a data structure example of the cumulative frequency distribution table 2000. The cumulative frequency distribution table 2000 has a pixel value column 2010 and a cumulative frequency distribution column 2020, and it associates the numbers (cumulative frequency distribution) of pixels having pixel values of and below the respective pixel values.

The threshold-value calculation module 1970 is connected with the target-number-of-black-pixels calculation module 1930, the cumulative frequency distribution module 1960 and the binarization module 1980, whereby the threshold value TH in the case of binarizing the image Affine-transformed by the Affine transform module 1940 is calculated on the basis of the numbers of pixels as calculated by the cumulative frequency distribution module 1960 and the target number of black pixels as calculated by the target-number-of-black-pixels calculation module 1930. That is, the pixel value at which the value of a cumulative frequency distribution is the nearest to the target number of black pixels is calculated as the threshold value TH. Alternatively, the pixel value at which the value of the cumulative frequency distribution is larger than the target number of black pixels and at which the value of the cumulative frequency distribution is the nearest to the target number of black pixels, may well be calculated as the threshold value TH. In addition, the calculated threshold value TH is delivered to the binarization module 1980.

The binarization module 1980 is connected with the Affine transform module 1940 and the threshold-value calculation module 1970, whereby the image Affine-transformed by the Affine transform module 1940 is binarized on the basis of the threshold value calculated by the threshold-value calculation module 1970, and the binarized image is outputted as an output binary image 1999.

Here, the pixel values after the Affine transform as have been mapped into the values of "0"-"255" are denoted by F. The binarization output is denoted by H. The binarization module 1980 executes the binarization in conformity with Formula (22). Incidentally, it is assumed that H=0 corresponds to white, while H=1 corresponds to black.

[Equation 22]

$$H=1 \text{ for } F<TH$$

$$H=0 \text{ for } F\geqq TH \qquad (22)$$

<3. 2. Second Exemplary Embodiment>

In the first exemplary embodiment stated before, in the threshold-value calculation module 1970, the pixel value at which the value of the cumulative frequency distribution is near to the target number of black pixels is found as the threshold value TH, and in the binarization module 1980, the calculation of Formula (18) is executed so as to output the binary image. In such a case, a phenomenon as stated below will sometimes take place.

An example shown in FIG. 21 corresponds to a case where a pixel value F1 which has the value of a cumulative frequency distribution as is nearest to the target number of pixels, among pixel values having the values of the cumulative frequency distribution as are smaller than the target number of pixels, and a pixel value F2 which has the value of the cumulative frequency distribution as is nearest to the target number of pixels, among pixel values having the values of the cumulative frequency distribution as are larger than the target number of pixels, exhibit a drastic difference in the value of the cumulative frequency distribution. In such a case, when the threshold value TH is set at the pixel value F1, it becomes much smaller than the target number of black pixels. To the contrary, when the threshold value TH is set at the pixel value F2, it becomes much larger than the target number of black pixels.

An operation to be stated below is executed in order to cope with such a case.

In the threshold-value calculation module 1970, a pixel value at which the value of the cumulative frequency distribution is larger than the target number of black pixels and at which the value of the cumulative frequency distribution is near to the target number of black pixels is calculated as the threshold value TH. In the example shown in FIG. 21, TH=F2 holds. Incidentally, the pixel value F1 is "1" lower than the threshold value TH.

In addition, in the binarization module 1980, the pixels are binarized by the comparisons between the threshold value calculated by the threshold-value calculation module 1970 and the pixel values of the image subjected to the Affine transform by the Affine transform module 1940, and in a case where the threshold value and the pixel value are the same, the pixels of the pixel value are binarized on the basis of the target number of black pixels as has been calculated by the target-number-of-black-pixels calculation module 1930. By way of example, in the case where the threshold value and the pixel value are the same, the pixels of the pixel value may well be binarized on the basis of the target number of black pixels as has been calculated by the target-number-of-black-pixels calculation module 1930, and the number of pixels as to which the threshold value and the pixel value are the same. In addition, the binarization in the case where the threshold value and the pixel value are the same may well be executed in such a manner that the bulk of black pixels is scraped off from outside by performing an error diffusion and a distance transform.

More concretely, the binarization processing is executed in conformity with, for example, Formula (23):

[Equation 23]

$$H=1 \text{ for } F<TH$$

$$H=0 \text{ for } F>TH \qquad (23)$$

In case of F=TH, some of pixels whose pixel value is the threshold value TH are determined as black pixels, and the remaining pixels as white pixels. That processing of the binarization module 1980 which is limited to the case of F=TH will be stated below.

When a cumulative frequency in the case of F=F1 is subtracted from the target number of black pixels, the number of pixels which must be determined as black pixels at the time of F=TH is found. This number of pixels is denoted by I (the number of pixels which are determined as black pixels, among the pixels having the pixel value of the threshold value TH). Further, the number J of pixels whose pixel value becomes F=F2 has also been found because it has been calculated by the cumulative frequency distribution module 1960.

In the case of F=TH, the binarization may be controlled so as to determine the black pixels at a probability of 1/J and the white pixels at a probability of (J−I)/J.

By way of example, pixels may be selected at random, or it is also allowed to approximate I/J by a rational number U/V (where U and V denote the smallest possible natural numbers) and to repeat processing in which, after U pixels have been successively determined as black pixels, V pixels are successively determined as white pixels.

Alternatively, it is also allowed that, in error diffusion fashion, a density target value in the case of F=TH is set at I/J, whereupon errors are diffused only to the pixels of F=TH. More specifically, an initial value e=0 is assumed, and a suitable threshold value TH2 (for example, 0.5) is set.

For $e+I/J>TH2$, H=1 is determined, and new_e=e I/J−1 is dispersed to the neighboring pixel of F=TH.

For $e+I/J \leqq TH2$, H=0 is determined, and new_e=e I/J is dispersed to the neighboring pixel of F=TH.

Here, the "neighboring pixel of F=TH" may be the pixel of F=TH as appears next in a raster scan, or it may well be the pixel of F=TH as is not binarized yet and as appears next in an identical row and an identical column. Alternatively, it may well be the pixel of F=TH as appears next at an obliquely left lower position or an obliquely right lower position.

In the error diffusion of the ordinary Floyd & Steinberg scheme, the error is diffused to neighboring 4 pixels. There is also a technique in which the error is diffused to pixels up to the fourth pixel of F=TH appearing next.

A technique to be stated below will be indicated as an example.

Figure 22:
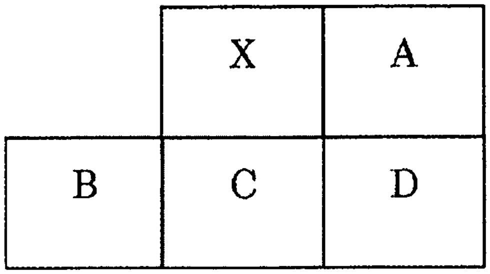
FIG. 22 is an explanatory diagram showing an example of error diffusion.

FIG. 22 is an explanatory diagram showing the example of the error diffusion.

First, as exemplified in FIG. 22, "X" is assumed to be a pertinent pixel which is to be binarized. Besides, F=TH is assumed. An error is diffused to the pixel of F=TH among pixels A, B, C and D, with the same coefficient as that of the Floyd & Steinberg scheme. In a case where the pixel of F=TH does not exist among the pixels A, B, C and D, the error which has failed to be diffused is diffused to the pixel of F=TH as appears next in the raster scan. As the coefficients on those occasions, the larger ones of coefficients having failed to be diffused are used in succession.

Figure 23:
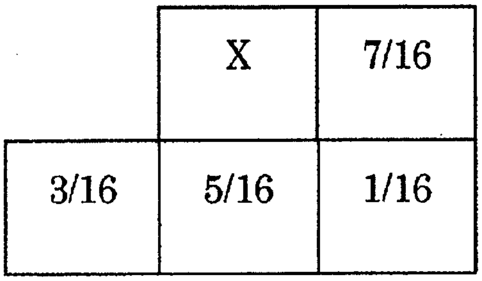
FIG. 23 is an explanatory diagram showing a diffusion coefficient example of the error diffusion.

The diffusion coefficients of the Floyd & Steinberg scheme are exemplified in FIG. 23. Incidentally, there are various other coefficients, and hence, the examples are not restrictive.

Alternatively, the distance transform of a binary image may well be executed. The "distance transform" is a transform in which a distance from the outer periphery of the bulk of the black pixels of the binary image is set as the value of each individual pixel. Among the pixels of F=FH, pixels of smaller distances are successively determined as white pixels. Owing to this technique, the bulk of the black pixels may well be scraped off from outside.

<3. 3. Other Exemplary Embodiments>

In the exemplary embodiments stated before, the processing in which the density of the whole pertinent image is saved has been indicated.

The density of each part of the pertinent image may well be saved. It is also allowed to execute processing in which the pertinent image is divided into blocks, the number of black pixels is measured every block, and the measured number of black pixels is saved. That is, it is also allowed to additionally dispose a division module which divides a binary image to-be-processed 1901 into blocks, and a synthesis module which synthesizes the binary image binarized by the binarization module 1980, thereby to generate a binary image obtained after the Affine transform of the binary image 1901. In this case, the binary image to which the number-of-black-pixels measurement module 1910 and the Affine transform module 1940 are directed becomes the binary image which has been divided into the blocks by the division module.

Figure 24A:
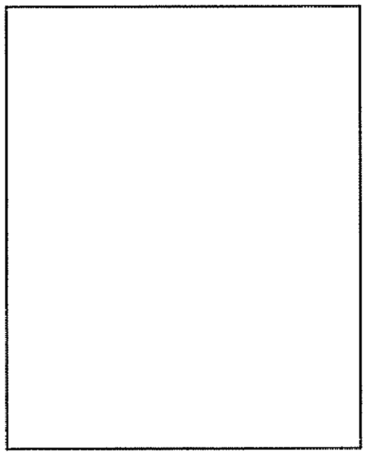
FIGS. 24A to 24E are explanatory diagrams showing an example in which transformation is executed every block.
Figure 24B:
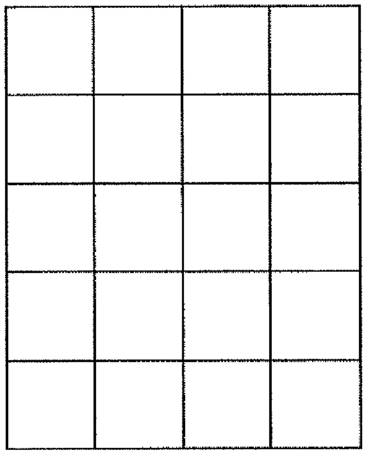

More specifically, as exemplified in FIGS. 24A-24E, the division module divides the binary image 1901 being a pertinent image (refer to FIG. 24A), into blocks (refer to FIG. 24B).

A divided block image (refer to FIG. 24C) is assumed to be the pertinent binary image 1901 in FIG. 19.

Using the configuration exemplified in FIG. 19, the output binary image 1999 is created. This image is provided as an output block image (refer to FIG. 24D).

Figure 24C:
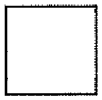
Figure 24D:
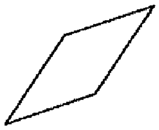

A plurality of output block images (refer to FIG. 24D) are generated for a plurality of block images (refer to FIG. 24C). Threshold values which are used for generating the individual output block images, are calculated independently of one another. Of course, the threshold values of the respective blocks become different values in some cases and the same value in the other cases.

Figure 24E:
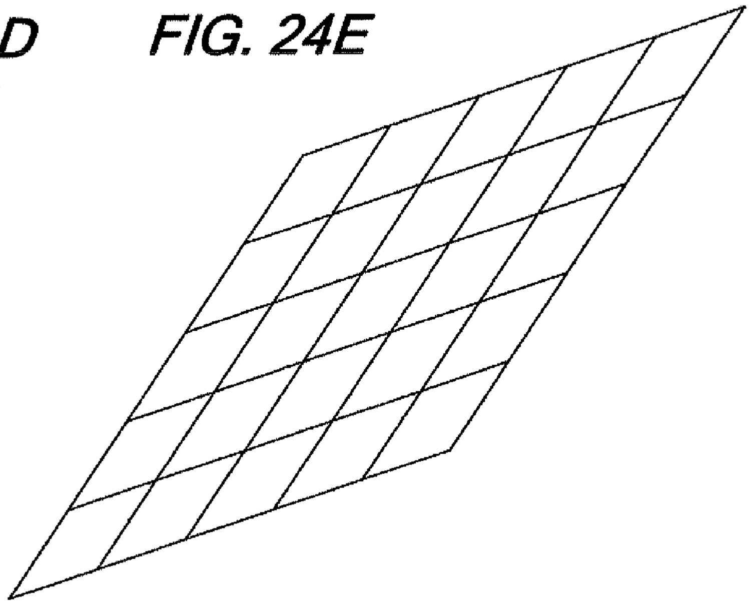

In addition, the synthesis module unites the plurality of output block images generated by the binarization module 1980, thereby to generate the output binary image after the synthesis (refer to FIG. 24E).

In the exemplary embodiments stated before, the number of black pixels of the pertinent binary image has been counted, but obviously the number of white pixels may well be counted. Of course, the target number of black pixels is replaced with the target number of white pixels. Alternatively, a mean density or the like may well be employed by measuring it with the number of black pixels or the number of white pixels of the pertinent binary image. Anyway, as long as a value is mutually convertible with the number of black pixels, it may be similarly processed.

Figure 25:
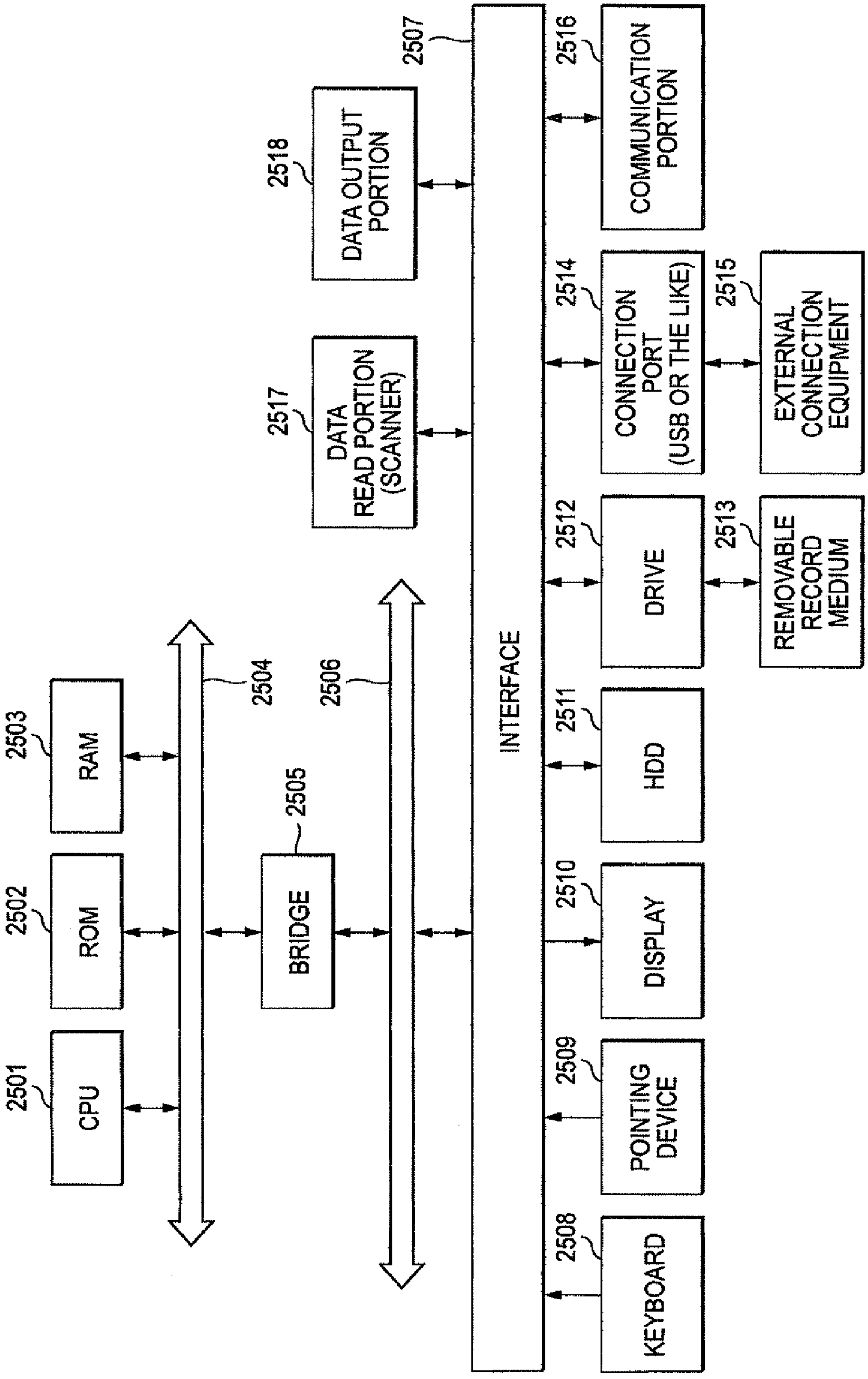
FIG. 25 is a block diagram showing a hardware configuration example of a computer which incarnates the exemplary embodiment.

A hardware configuration example of the image processing apparatus in any of the foregoing exemplary embodiments will be described with reference to FIG. 25. The configuration shown in FIG. 25 is configured of, for example, a personal computer (PC), and it shows the hardware configuration example which includes a scanner or the like data read portion 2517, and a printer or the like data output portion 2518.

A CPU (Central Processing Unit) 2501 is a control portion which executes processing conforming to a computer program that describes the execution sequence of the various modules explained in any exemplary embodiment stated before, that is, the respective modules of the number-of-black-pixels measurement module 1910, the determinant calculation module 1920, the target-number-of-black-pixels calculation module 1930, etc.

A ROM (Read Only Memory) 2502 stores therein programs, operational parameters, etc. which the CPU 2501 uses. A RAM (Random Access Memory) 2503 stores therein programs which are used in the run of the CPU 2501, and parameters etc. which change on occasion in the run. These are interconnected by a host bus 2504 which is configured of a CPU bus, etc.

The host bus 2504 is connected through a bridge 2505 to an external bus 2506 such as a PCI (Peripheral Component Interconnect/Interface) bus.

A keyboard 2508, and a pointing device 2509 such as a mouse are input devices which are manipulated by a manipulator. A display 2510 includes a liquid-crystal display device, a CRT (Cathode Ray Tube), or the like, and it displays various information items as text or image information.

An HDD (Hard Disk Drive) 2511 has built-in hard disks, and it drives the hard disks so as to record or reproduce programs which are run by the CPU 2501, and information. An accepted image, the count result of the number of pixels, the threshold value of binarization, an output image, etc. are stored in the hard disks. Further, other various computer programs such as various data processing programs are stored.

A drive 2512 reads out data or programs which are recorded in an installed removable record medium 2513 such as a magnetic disk, optical disk, magneto-optic disk or semiconductor memory, and it feeds the data or programs to the RAM 2503 which is connected through an interface 2507, the external bus 2506, the bridge 2505 and the host bus 2504. The removable record medium 2513 is also utilizable as a data record area similar to the hard disk.

A connection port 2514 is a port to which an external connection equipment 2515 is connected, and it has a connection portion of USB, IEEE1394 or the like. The connection port 2514 is connected to the CPU 2501, etc. through the interface 2507, the external bus 2506, the bridge 2505 and the host bus 2504. A communication portion 2516 is connected to a network, and is executes data communication processing with the exterior. The data read portion 2517 is, for example, the scanner, and it executes processing for reading a document. The data output portion 2518 is, for example, a printer, and it executes processing for outputting document data.

Incidentally, the hardware configuration of the image processing apparatus shown in FIG. 25 illustrates one configurational example, and this exemplary embodiment is not restricted to the configuration shown in FIG. 25, but it may have a configuration capable of executing the modules described in this exemplary embodiment. By way of example, some modules may well be configured of dedicated hardware elements (for example, Application Specific Integrated Circuits: ASICs), it is also allowed to adopt an aspect in which some modules exist in an external system and are connected by a communication line, and further, a plurality of systems as shown in FIG. 25 may well be interconnected by communication lines so as to cooperate with one another. Besides, the system shown in FIG. 25 may well be incorporated in a copier, a facsimile, a scanner, a printer, a composite machine (an image processing apparatus having the functions of any two or more of a scanner, a printer, a copier, a facsimile, etc.), or the like.

Incidentally, although the equations have been used in the foregoing exemplary embodiments, they shall include equivalents. The "equivalents" shall include, not only the equations themselves, but also the reduction of the equations to the extent of exerting no influence on final results, solving the equations by algorithmic solutions, etc.

Besides, the various exemplary embodiments stated before may be combined (the combination includes, for example, applying any module in a certain exemplary embodiment into another exemplary embodiment, or replacing any modules), and the technique explained in the Background Art may well be employed as the processing content of each module.

Incidentally, the described programs may be provided in a state where they are stored in a record medium, or they may well be provided by communication means. In that case, by way of example, the described programs may well be grasped as the invention of a "computer-readable record medium in which programs are recorded".

The "computer-readable record medium in which programs are recorded" signifies a computer-readable record medium in which programs are recorded, and which is used for the installation and run of the programs, the circulation of the programs, etc.

Incidentally, the record media include, for example, digital versatile disks (DVDs) such as "DVD-R, DVD-RW and DVD-RAM" which are standards stipulated by the DVD Forum, and "DVD+R and DVD+RW" which are standards stipulated by DVD+RW, compact disks (CDs) such as a read-only memory (CD-ROM), CD recordable (CD-R) and CD rewritable (CD-RW), "Blu-ray Disc (registered trademark)", a magneto-optic disk (MO), a flexible disk (FD), a magnetic tape, a hard disk, a read-only memory (ROM), an electrically erasable and programmable read-only memory (EEPROM), a flash memory, a random access memory (RAM), etc.

In addition, the programs or at least one of them may well be recorded in the record medium for saving, circulation etc. Besides, the programs or at least one of them may well be transmitted by communications with a transmission medium such as a wired network, a radio communication network or the combination thereof as is employed for, for example, a local area network (LAN), a metropolitan area network (MAN), a wide area network (WAN), the Internet, an intranet or an extranet, and they/it may well be carried over a carrier wave.

Further, any of the programs may well be part of another program, or it may well be recorded in a record medium together with a separate program. Besides, any of the programs may well be recorded in a plurality of record media in divided fashion. Besides, it may well be recorded in any aspect such as a compressed or encrypted state as long as it is restorable.

The foregoing description of the exemplary embodiment of the present invention has been provided for the purpose of illustration and description. It is not intended to be exhaustive or to limit the invention to the precise forms disclosed. Obviously, many modifications and various will be apparent to practitioners skilled in the art. The embodiments were chosen and described in order to best explain the principles of the invention and its practical application, thereby enabling other skilled in the art to understand the invention for various embodiments and with the various modifications as are suited to the particular use contemplated. It is intended that the scope of the invention be defined by the following claims and their equivalents.

What is claimed is:

1. An image processing apparatus comprising:

a count unit that counts the number of black pixels or the number of white pixels of an original binary image;

a transform unit that transforms the original binary image into a transformed image based on a given transform level, each pixel value of the transformed image being represented as a multiple value, the transformed image having a same number of pixels as the original image;

a first calculation unit that calculates the number of black pixels or the number of white pixels of the transformed image, based on the given transform level and the number of black pixels or the number of white pixels of the original binary image counted by the count unit;

a second calculation unit that calculates a threshold level based on the number of pixels for each pixel value of the transformed image and the number of black pixels or the number of white pixels of the transformed image calculated by the first calculation unit;

a binarization unit that binarizes the transformed image based on the threshold level.

2. The image processing apparatus according to claim 1, wherein the transform unit transforms the original binary image into the transformed image based on a given movement level.

3. The image processing apparatus according to claim 2, wherein the binarization unit binarizes the transformed image by comparing the threshold level and each of the pixel values in the transformed image and when the pixel value is equal to the threshold value, the binanzation unit binarizes the pixel value in the transformed image based on the number of black or white pixels of the transformed image calculated by the first calculation unit.

4. The image processing apparatus according to claim 3 further comprising:

a division unit that divides the original binary image into a plurality of rectangular shaped binary images; and a synthesis unit that synthesizing a plurality of binary images binarized by the binarization unit, wherein the count unit counts the number of black pixels or the number of white pixels of each of the rectangular-shaped binary images, and wherein the transform unit transforms each of the rectangular-shaped binary image into a transformed image.

5. The image processing apparatus according to claim 2 further comprising:

a division unit that divides the original binary image into a plurality of rectangular shaped binary images; and a synthesis unit that synthesizing a plurality of binary images binarized by the binarization unit, wherein the count unit counts the number of black pixels or the number of white pixels of each of the rectangular-shaped binary images, and wherein the transform unit transforms each of the rectangular-shaped binary image into a transformed image.

6. The image processing apparatus according to claim 1, wherein the binarization unit binarizes the transformed image by comparing the threshold level and each of the pixel values in the transformed image, and when the pixel value is equal to the threshold value, the binarization unit binarizes the pixel value in the transformed image based on the number of black or white pixels of the transformed image calculated by the first calculation unit.

7. The image processing apparatus according to claim 6 further comprising:

a division unit that divides the original binary image into a plurality of rectangular shaped binary images; and a synthesis unit that synthesizing a plurality of binary images binarized by the binarization unit, wherein the count unit counts the number of black pixels or the number of white pixels of each of the rectangular-shaped binary images, and wherein the transform unit transforms each of the rectangular-shaped binary image into a transformed image.

8. The image processing apparatus according to claim 1 further comprising:

a division unit that divides the original binary image into a plurality of rectangular-shaped binary images; and a synthesis unit that synthesizing a plurality of binary images binarized by the binarization unit, wherein the count unit counts the number of black pixels or the number of white pixels of each of the rectangular-shaped binary images, and, wherein the transform unit transforms each of the rectangular-shaped binary image into a transformed image.

9. A non-transitory computer readable medium storing a program causing a computer to execute a process for image processing, the process comprising:

counting the number of black pixels or the number of white pixels of an original binary image;

transforming the original binary image into a transformed image based on a given transform level, each pixel value of the transformed image being represented as a multiple value, the transformed image having a same number of pixels as the original image;

calculating the number of black pixels or the number of white pixels of the transformed image, based on the given transform level and the number of black pixels or the number of white pixels of the original binary image;

calculating a threshold level based on the number of pixels for each pixel value of the transformed image and the number of black pixels or the number of white pixels of the transformed image;

binarizing the transformed image based on the threshold level.

10. An image processing method comprising:

counting the number of black pixels or the number of white pixels of an original binary image;

transforming the original binary image into a transformed image based on a given transform level, each pixel value of the transformed image being represented as a multiple value, the transformed image having a same number of pixels as the original image;

calculating the number of black pixels or the number of white pixels of the transformed image, based on the given transform level and the number of black pixels or the number of white pixels of the original binary image;

calculating a threshold level based on the number of pixels for each pixel value of the transformed image and the number of black pixels or the number of white pixels of the transformed image;

binarizing the transformed image based on the threshold level.

* * * * *